United States Patent
Lee et al.

(10) Patent No.: US 9,645,420 B2
(45) Date of Patent: *May 9, 2017

(54) DISPLAY PANEL

(75) Inventors: Hee-Keun Lee, Suwon-si (KR); Hae-Ju Yun, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 333 days.

This patent is subject to a terminal disclaimer.

(21) Appl. No.: 13/190,233

(22) Filed: Jul. 25, 2011

(65) Prior Publication Data

US 2012/0320329 A1 Dec. 20, 2012

(30) Foreign Application Priority Data

Jun. 14, 2011 (KR) .................. 10-2011-0057361

(51) Int. Cl.
  *G02F 1/1333* (2006.01)
  *G09F 9/30* (2006.01)
  *G02F 1/167* (2006.01)
  *G02B 26/00* (2006.01)

(52) U.S. Cl.
  CPC ...... *G02F 1/133305* (2013.01); *G02B 26/005* (2013.01); *G02F 1/167* (2013.01); *G02F 2201/503* (2013.01); *G02F 2201/56* (2013.01); *G09F 9/30* (2013.01)

(58) Field of Classification Search
  CPC .................. G02F 1/1333; G02F 1/133305
  USPC ................................. 349/158–160
  See application file for complete search history.

(56) References Cited

U.S. PATENT DOCUMENTS

| | | | | |
|---|---|---|---|---|
| 6,191,840 | B1* | 2/2001 | Bon | 349/187 |
| 7,999,904 | B2* | 8/2011 | Tseng et al. | 349/158 |
| 8,203,834 | B2* | 6/2012 | Kwon et al. | 361/679.21 |
| 8,393,175 | B2* | 3/2013 | Kohli et al. | 65/30.14 |
| 8,520,182 | B2* | 8/2013 | Lee et al. | 349/158 |
| 8,599,181 | B2* | 12/2013 | Lin et al. | 345/207 |
| 8,657,456 | B2* | 2/2014 | Yamagata et al. | 362/97.1 |
| 8,885,116 | B2 | 11/2014 | Bayne | |
| 2004/0222974 | A1 | 11/2004 | Hong et al. | |
| 2008/0094561 | A1* | 4/2008 | Fan et al. | 349/151 |
| 2011/0007042 | A1 | 1/2011 | Miyaguchi | |
| 2011/0052836 | A1 | 3/2011 | Kim et al. | |
| 2011/0194063 | A1* | 8/2011 | Lee et al. | 349/153 |

FOREIGN PATENT DOCUMENTS

| | | |
|---|---|---|
| CN | 1514400 A | 7/2004 |
| CN | 101846822 A | 9/2010 |
| JP | 02-264923 | 10/1990 |
| JP | 05-323302 | 12/1993 |

(Continued)

OTHER PUBLICATIONS

L. Stoch, Flexibility of Structure and Glass-Forming Ability: A chemical Approach, Sep. 1999.*

*Primary Examiner* — Dung Nguyen

(74) *Attorney, Agent, or Firm* — Innovation Counsel LLP

(57) ABSTRACT

A display panel that includes a flexible substrate is provided. The flexible substrate includes a first corner, and a plurality of display elements disposed on the first substrate. The flexible substrate also includes a first primary edge and a second primary edge which extend in different directions to meet at the first corner, and the first corner includes a first edge having a polygonal shape with n (n is a natural number of 2 or more) vertexes.

18 Claims, 22 Drawing Sheets

(56) References Cited

FOREIGN PATENT DOCUMENTS

| | | |
|---|---|---|
| JP | 06-082805 | 3/1994 |
| JP | 10-274775 A | 10/1998 |
| JP | 2000-199891 A | 7/2000 |
| JP | 2000-218486 | 8/2000 |
| JP | 2001-042303 | 2/2001 |
| JP | 2002-341792 A | 11/2002 |
| JP | 2003-257617 | 9/2003 |
| JP | 2004-101741 | 4/2004 |
| JP | 2004-151551 | 5/2004 |
| JP | 2007-047265 | 2/2007 |
| JP | 2008-102515 | 5/2008 |
| JP | 2008-225063 A | 9/2008 |
| JP | 2010-085543 | 4/2010 |
| JP | 2011-034066 | 2/2011 |
| JP | 2011-516918 | 5/2011 |
| KR | 1020000040086 A | 7/2000 |
| KR | 10-0831585 B | 5/2008 |
| KR | 1020100001738 A | 1/2010 |
| KR | 1020100044299 A | 4/2010 |
| WO | 2009123696 A2 | 10/2009 |

\* cited by examiner (A)

(B)

(A)

(B)

DISPLAY PANEL

CROSS-REFERENCE TO RELATED APPLICATION

This application claims priority to and the benefit of Korean Patent Application No. 10-2011-0057361 filed in the Korean Intellectual Property Office on Jun. 14, 2011, the entire contents of which are incorporated herein by reference.

BACKGROUND OF THE INVENTION (a) Field of the Invention

The present invention relates to a display panel and more particularly, to a display panel including a flexible substrate and a manufacturing method thereof.

(b) Description of the Related Art

Representative examples among flat panel display devices currently in use include liquid crystal displays, organic light emitting diode displays, electrophoretic displays, electrowetting displays, and the like.

One of the more common types of flat panel displays currently in use is the liquid crystal display. A liquid crystal display includes two sheets of display panels, or substrates, that each have field generating electrodes, such as a pixel electrode and a common electrode, formed thereon. A liquid crystal layer is interposed between the two sheets of display panels. The liquid crystal display generates electric fields in the liquid crystal layer by applying voltage to the field generating electrodes. The electric field determines the orientation of the liquid crystal molecules in the liquid crystal layer, thus controlling polarization of incident light so as to display images. To affix the two panels of the liquid crystal display to each other, and to prevent the liquid crystal material of the liquid crystal layer from leaking out of the panel, the edges of two display panels are sealed by a sealant.

Another type of flat panel display is the organic light emitting diode display. An organic light emitting diode display includes a hole injection electrode (anode) and an electron injection electrode (cathode), and an organic emission layer formed therebetween, and is a self-emission type display device where a hole injected from the anode and an electron injected from the cathode are re-coupled and dissipated in the organic emission layer to emit light.

In the case of display devices that utilize substrates made from glass, which is a relatively heavy and fragile material, the portability and size of the display screen is limited by the weight and vulnerability of the glass. Accordingly, display devices have recently been developed that use plastic substrates. Plastic substrates are a light weight, shock-resistant and flexible.

However, because plastic substrates are pliable, defects in the edges of the plastic substrate can be easily generated during the manufacturing process of display devices that use plastic substrates, even if only a slight impact is applied. In particular, if the edges of the liquid crystal display panel are bent or modified by a physical stimulus, such as an external impact, two panels coupled by the sealant may be separated, or bonds within the plastic substrate itself may be broken or detached, such that product yield is reduced.

The above information disclosed in this Background section is only for enhancement of understanding of the background and therefore it may contain information that does not form the prior art that is already known to a person of ordinary skill in the art.

SUMMARY OF THE INVENTION

A display panel that uses a flexible substrate is provided, which has a structure that can prevent defects that may occur during the manufacturing process of the display panel.

A display panel including: a first substrate which is flexible and includes a first corner; and a plurality of display elements disposed on the first substrate, in which the first substrate includes a first primary edge and a second primary edge which extend in different directions to meet at the first corner, and the first corner of the first substrate includes a first polygonal edge having n (n is a natural number of 2 or more) vertexes.

The display panel may further include a second substrate which is flexible and faces the first substrate, in which the second substrate may include a second corner, and an edge of the second corner of the second substrate may be aligned with the first polygonal edge of the first substrate.

The second corner of the second substrate may include a second polygonal edge having n (n is a natural number of 2 or more) vertexes, and the second polygonal edge may have the same shape as at least a portion of the first polygonal edge, and the first corner and second corner are positioned so that the second polygonal edge is aligned with the portion of the first polygonal edge.

The first substrate may include at least one pad region.

The first corner may be connected with the at least one pad region.

At least one of the first polygonal edge and the second polygonal edge may include a curving edge in which the n is infinite.

The curving edge may include a part of at least one of a circle, an oval, a parabola, a hyperbola, a graph of trigonometrical function, a graph of a polynomial function.

The curving edge may include a part of a circle having a radius in the range of 5 to 200 mm.

The display panel may further include a second substrate which faces the first substrate and is flexible, in which the second substrate may include a second corner and the second corner includes a second curving edge having a same shape as at least a portion of the first curing edge, and the second curving edge is aligned with the portion of the first curving edge.

The shape of at least one of the first curving edge and the second curving edge may correspond to a part of at least one of a circle, an oval, a parabola, a hyperbola, a graph of trigonometrical function, and a graph of a polynomial function.

The display panel may include one of a liquid crystal display panel, an organic light emitting diode display panel, an electophoretic display panel, and an electrowetting display panel.

The display panel may further include a second substrate facing the first substrate, in which the second substrate may include a second corner, and the second corner of the second substrate may be spaced apart from the first corner and disposed within a boundary of the first substrate.

The second corner of the second substrate may includes a second polygonal edge having n (n is a natural number of 2 or more) vertexes In another aspect, a display panel is provided including: a first substrate and a second substrate which face each other and are flexible and a plurality of display elements disposed on the first substrate, in which the first substrate and the second substrate each include a plurality of corners, and an edge of the first substrate is aligned along an edge of the second substrate at each of the plurality of corners.

At least one of the plurality of corners of the first substrate and the second substrate may include a polygonal edge having n (n is a natural number of 2 or more) vertexes.

The first substrate may include a pad region and the pad region may be positioned between two adjacent corners.

In a display device such as a liquid crystal display, an organic light emitting diode display, an electophoretic display, and an electrowetting display, when a corner of a display panel in the display device includes a curving edge or a edge having polygonal shape with at least two vertexes, defects in the display panel in which the flexible substrate becomes cracked or peeled, or in which a sealant combining two substrates detaches from the substrates can be prevented. Further, in the corner of the display panel, when the edges of two substrates are close to each other or align with each other, although an external impact is applied to the corner portion of the display panel, two substrates can be prevented from being separated when the flexible substrate or the sealant combining the two substrates is detached.

DETAILED DESCRIPTION OF THE EMBODIMENTS

The embodiments will be described more fully hereinafter with reference to the accompanying drawings, in which exemplary embodiments are shown. As those skilled in the art would realize, the described embodiments may be modified in various different ways, all without departing from the spirit or scope of the present invention.

Hereinafter, a display panel according to an exemplary embodiment will be described in detail with reference to the following drawings.

Figure 1:
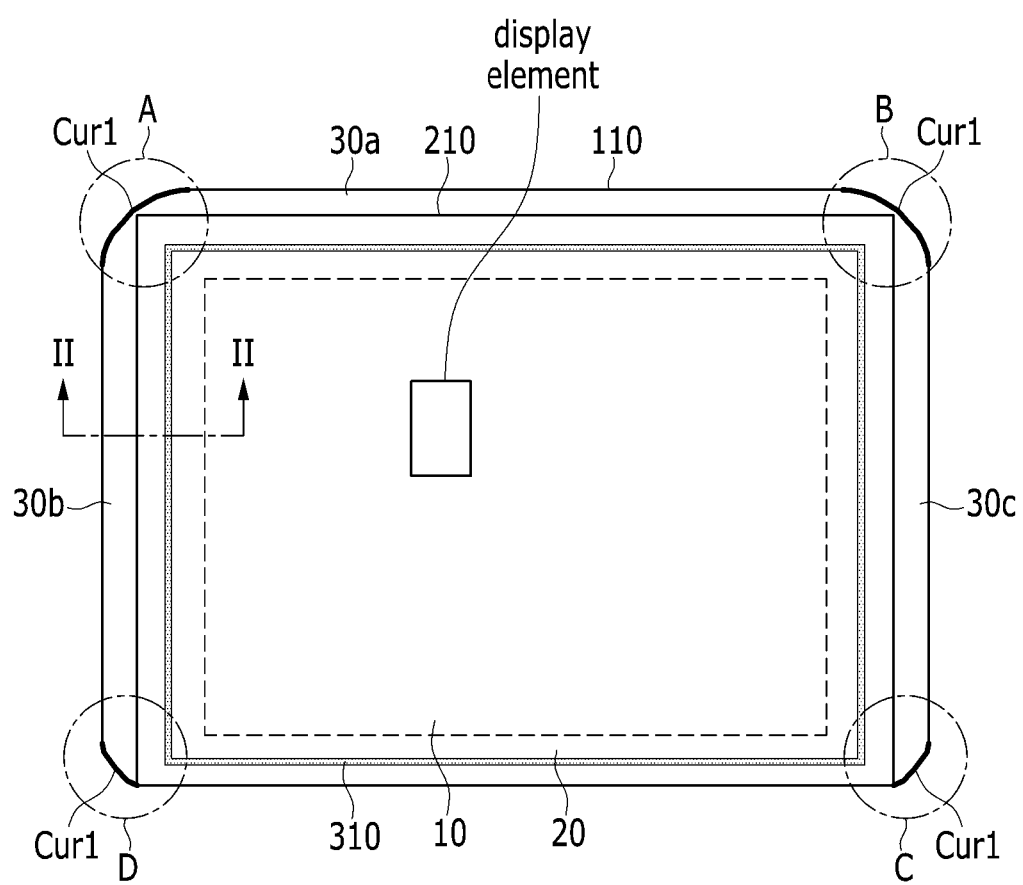
FIG. 1 is a plan view of a display panel according to an exemplary embodiment.
Figure 2:
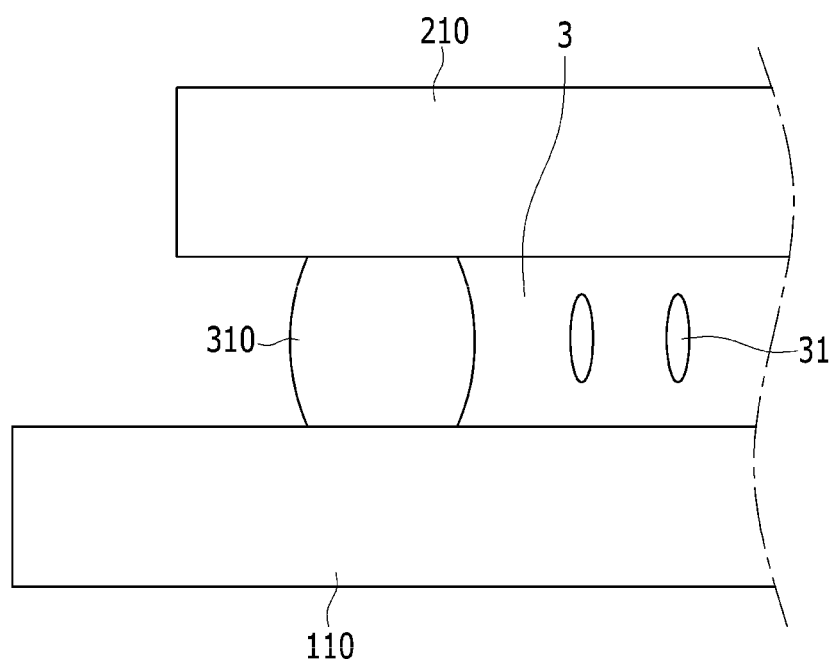
FIG. 2 is a cross-sectional view of a display panel shown in FIG. 1 taken along line II-II.
Figure 3:
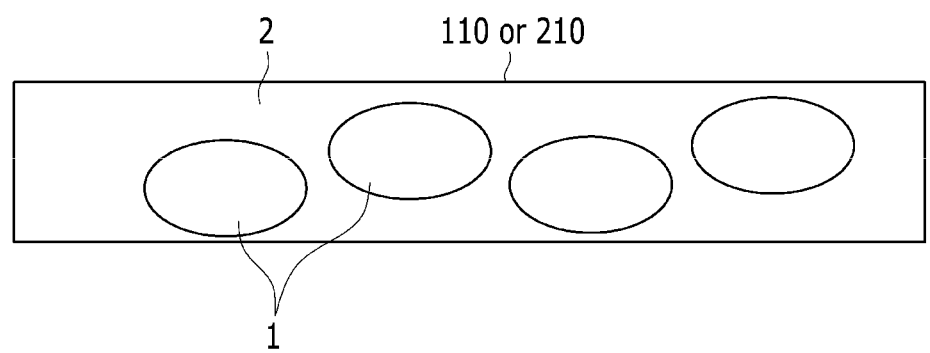
FIG. 3 is a cross-sectional view of a substrate in a display panel according to an exemplary embodiment.
Figure 4:
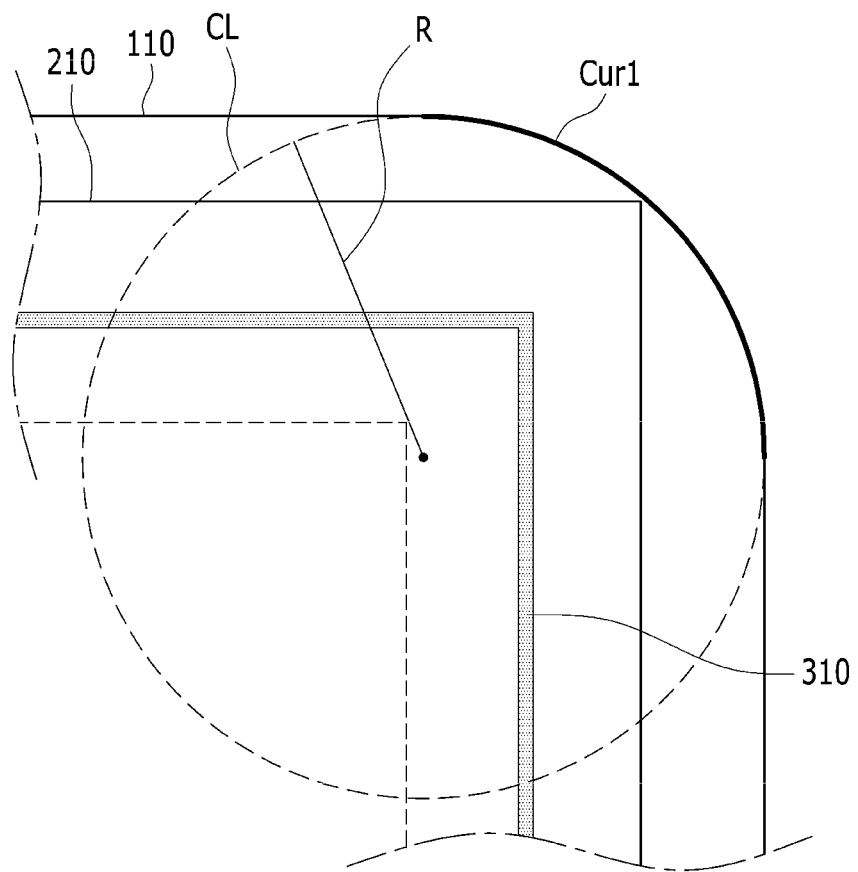
FIGS. 4 and 5 are plan views of a corner of a display panel according to an exemplary embodiment.
Figure 5:
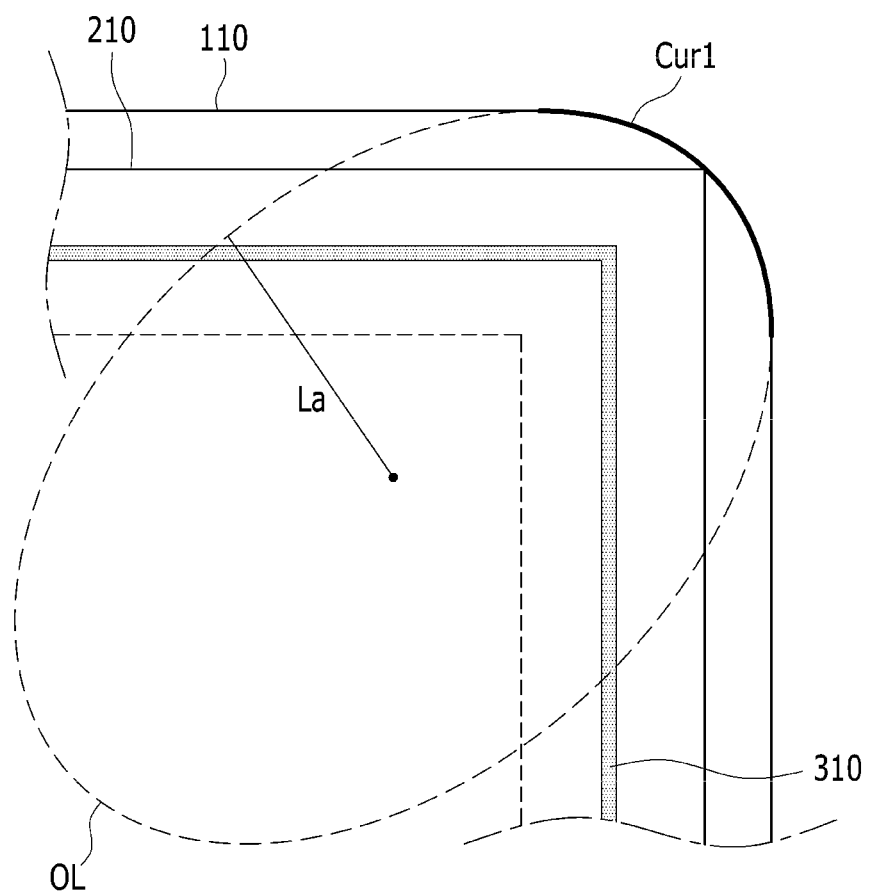

FIG. 1 is a plan view of a display panel according to an exemplary embodiment, FIG. 2 is a cross-sectional view of a display panel shown in FIG. 1 taken along line II-II, FIG. 3 is a cross-sectional view of a substrate in a display panel according to an exemplary embodiment, and FIGS. 4 and 5 are plan views of a corner of a display panel according to an exemplary embodiment.

Referring to FIG. 1, a display panel according to an exemplary embodiment such as a liquid crystal display, an electrowetting display, an electrophoretic display, and the like, may include two substrates. In detail, the display panel according to the exemplary embodiment n includes a lower substrate 110 and an upper substrate 210 facing each other, and if the display panel is, for example, a liquid crystal display, it may include a liquid crystal layer 3 interposed between two substrates 110 and 210, as shown in FIG. 2.

At least one of the lower substrate 110 and the upper substrate 210 is a flexible substrate and may include a material that can be easily bent without breaking, such as, for example, plastic. Referring to FIG. 3, at least one of the lower substrate 110 and the upper substrate 210 may include, for example, a fiber bundle 1 and a polymer resin 2. The fiber bundle 1 may be made of an optic fiber, or a yarn or a fabric using the optic fiber, and the polymer resin 2 may include an epoxy resin, an acryl resin, and the like. The fiber reinforced plastic (FRP) may be manufactured by impregnating the fiber bundle 1 in the polymer resin 2 and curing the polymer resin 2. When only one of the lower substrate 110 and upper substrate 210 is a flexible substrate, the other may be a glass substrate.

A plurality of display elements are disposed on the lower substrate 110. The plurality of display elements may include signal lines, such as a gate line transferring a gate signal and a data line transferring a data signal, a switching element connected to the gate line and the data line, and a pixel electrode connected to the switching element and receiving the data signal. The switching element may be a three-terminal element such as a thin film transistor, and a control terminal thereof is connected to the gate line, an input terminal thereof is connected to the data line, and an output terminal thereof is connected to the pixel electrode.

In the liquid crystal display, the upper substrate 210 faces the lower substrate 110 with the liquid crystal layer 3 interposed between the two substrates. The upper substrate 210 may include a color filter, a light blocking member, and an opposed electrode facing the pixel electrode and generating an electric field in the liquid crystal layer 3. However, at least one of the color filter, the light blocking member, and the opposed electrode may be formed instead on the lower substrate 110.

In the liquid crystal display, the liquid crystal layer 3 includes liquid crystal molecules 31 having a dielectric anisotropy. When the electric field is generated in the liquid crystal layer 3, a long axis of the liquid crystal molecules 31 of the liquid crystal layer 3 may be inclined to be vertical or horizontal to the direction of the electric field according to the dielectric anisotropy of the molecules 31.

Referring to FIGS. 1 and 2, the lower substrate 110 and the upper substrate 210 include a display area 10 displaying an image with a plurality of display elements, such as pixels, and a peripheral area 20 surrounding the display area 10. A sealant 310 is formed between the lower substrate 110 and the upper substrate 210 and around the display area 10 to combine and fix the two substrates 110 and 210. The sealant 310 may also be referred to as a seal or a sealing member. In a liquid crystal display, the sealant 310 may act to confine the liquid crystal material of the liquid crystal layer 3.

When the lower substrate 110 and upper substrate 210 are bonded with each other, the lower substrate 110 may include exposed pad regions 30a, 30b, and 30c which are not covered by the upper substrate 210, that is, in the pad regions 30a, 30b and 30c, the lower substrate 110 extends beyond the edge of the upper substrate 210. In the pad regions 30a, 30b, and 30c, pads for connecting the signal lines such as the gate line and the data line with a driver may be positioned. In the exemplary embodiment shown in FIG. 1, the pad regions 30a, 30b, and 30c are disposed along at least three different sides of lower substrate 110 and include an upper pad region 30a, a left pad region 30b, and a right pad region 30c. A gate driver transferring the gate signal to the gate line may be disposed at the left pad region 30b or the right pad region 30c and a data driver transferring the data signal to the data line may be disposed at the upper pad region 30a.

Each of the lower substrate 110 and the upper substrate 210 of the display panel according to the exemplary embodiment may include four primary edges and four corners A, B, C, and D. Each of the four primary edges may be formed in a straight line, and two adjacent primary edges meeting at a corner may extend in different directions from each other. For example, as shown in FIG. 1, each of the four primary edges may extend in a horizontal direction or a vertical direction (thus forming a rectangle).

Among four corners A, B, C, and D of the lower substrate 110, an outermost edge (hereinafter, referred to as an edge) of at least one corner connected with a pad region 30a, 30b, and 30c may include a curving edge Cur1. For example, a corner A disposed at the top left is formed at a point where the upper primary edge and the left primary edge of the lower substrate 110 meet, and the curving edge Cur1 of the edge of the corner A may be formed in a curved line. The curved line of the curving edge Cur1 may be a part of, for example, a circle, an oval, a parabola, a hyperbola, a graph of trigonometric function, a graph of a polynomial function, and the like.

Such curving edge Cur1 of a corner of the lower substrate 110 will be described with reference to FIGS. 4 and 5.

Referring to FIG. 4, the curving edge Cur1 of a corner of the lower substrate 110 may be a part of a circle CL. A radius R of the circle CL may be in the range of, for example, approximately 3 to 200 mm. Thus, defects that may occur in the sealant 310 or in the substrates 110 and 210 when the substrates 110 and 210 are bent or experience an external force may be significantly reduced. In particular, when the radius R of the circle CL is approximately 5 mm or more, as compared with the circle having a radius less than 5 mm, defects in the sealant 310 or defects in the substrates 110 and 210 due to an external impact or pressure during a manufacturing process may be greatly reduced. This will be described in more detail below with reference to the tests shown in FIGS. 6 and 7.

In the exemplary embodiment of FIG. 4, when the radius R of the circle CL is greatly increased (to infinitely increased), the corner of the lower substrate 110 is not formed in a curved line, but formed in a straight line. Because a pointed edge is removed from the corner of the display panel, defects in the substrates 110 and 210 generated during a manufacturing process of the display panel may be significantly reduced. This will be described in more detail in an exemplary embodiment shown in FIG. 13 described below.

Referring to FIG. 5, the curving edge Cur1 of the corner of the lower substrate 110 may be a part of an oval OL. In this case, a length La of a short axis of the oval OL may be, for example, about 3 to 400 mm.

In the upper substrate 210, among the four corners A, B, C, and D, at least one may be formed in a rounded, curved line like the four corners A, B, C, and D of the lower substrate 110. But as shown in FIG. 1, at least one of the four corners A, B, C and D of the upper substrate may be formed in a pointed corner (herein, a 'pointed corner' means a corner which is not curved but has a sharply pointed shape along the edge to form a vertex). In this case, one of the corners A, B, C, and D of the upper substrate 210 may have at least one vertex. The position of the vertexes of the corners A, B, C, and D of the upper substrate 210 may be aligned with the curving edge Cur1 of the lower substrate 110, so that the upper substrate 210 is flush with the lower substrate 110 at the vertexes. That is, in a plan view as shown in FIG. 1, the vertex of upper substrate 210 meets the curving edge Cur1 of the lower substrate 110, so that the position of the vertex coincides with the position of the curving edge Cur1. Alternatively, a distance between the vertexes of the corners A, B, C, and D of the upper substrate 210 and the curving edge Cur1 of the lower substrate 110 along a direction that is parallel to the surfaces of the substrates 110 and 210 may not be 0, but may be greater than zero, so that the position of the vertex and the position of the curving edge Cur1 are not aligned.

Figure 6:
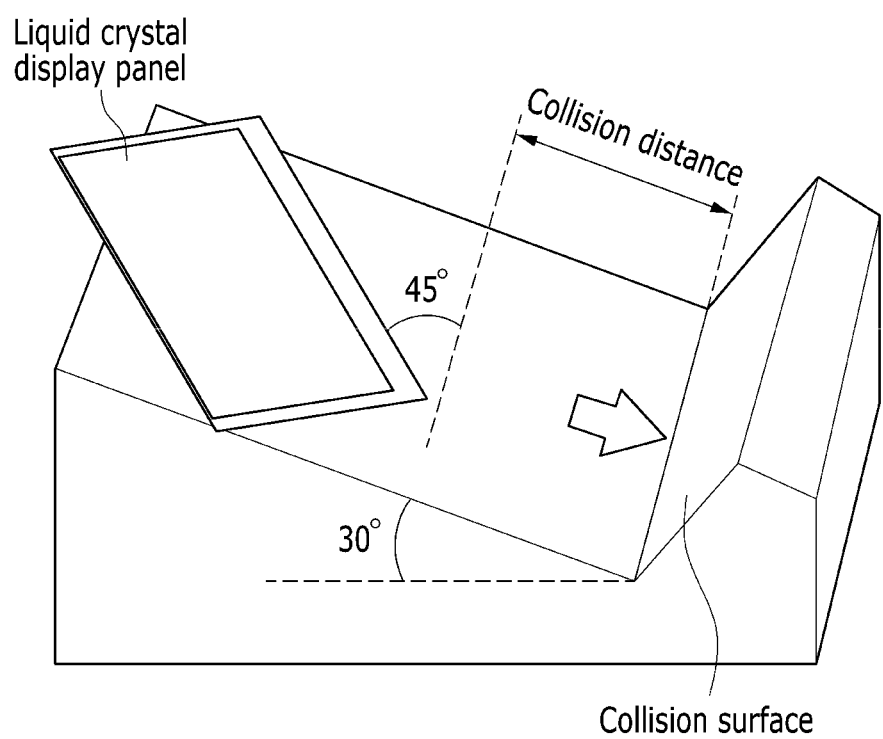
FIG. 6 is a diagram showing a method for a collision test of a display panel according to an exemplary embodiment.
Figure 7:
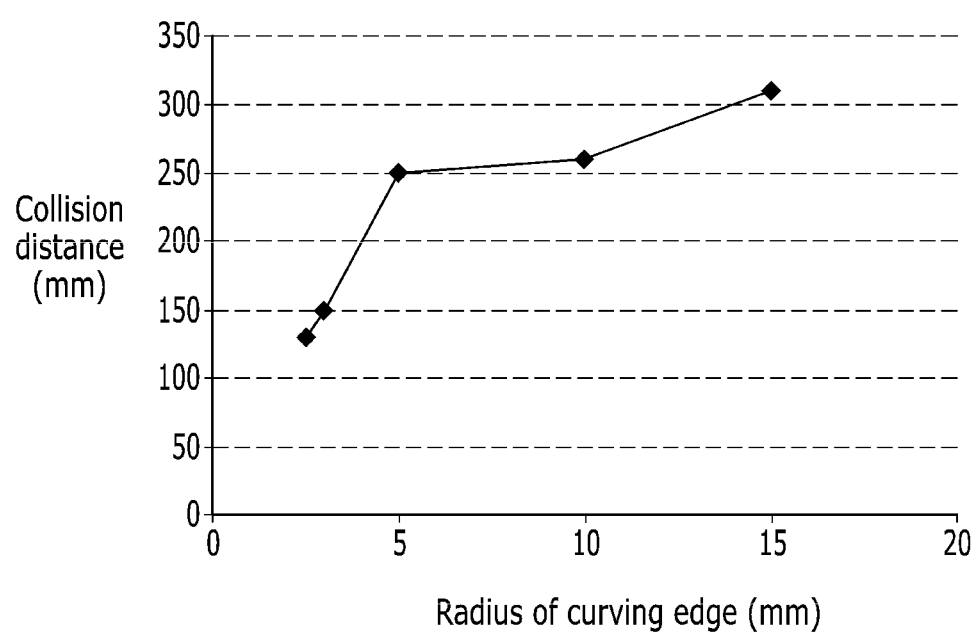
FIG. 7 is a graph illustrating a result of the collision test shown in FIG. 6.

FIG. 6 is a diagram showing a method for a collision test of a display panel according to an exemplary embodiment, and FIG. 7 is a graph illustrating a result of the collision test shown in FIG. 6.

In detail, FIG. 6 shows a method of measuring a collision distance at which a defect in a display panel occurs by colliding the corner of the display panel shown in FIG. 1 having the curving edge Cur1 among the corners A, B, C, and D with a collision surface, starting the test at a small distance from the collision surface and increasing the distance in subsequent trials until a defect occurs in the display panel after colliding with the collision surface. The display panel used in the test was a display panel having a size of 10.1 inch. Herein, the defects that may occur in the display panel as a result of the collision when it has traversed the collision distance may include, for instance, separation of the lower substrate 110 and the upper substrate 210, cracking or peeling of the lower substrate 110 or the upper substrate 210, or breaking or detachment of the sealant 310. An example of the case of cracking or peeling of the substrates 110 and 210 may include a situation in which the bonding between the fiber bundle 1 and the polymer resin 2 shown in FIG. 3 is broken. As a condition of the collision test, an angle between one primary edge of the display panel and a collision surface was 45 degrees and an angle between an inclined surface at which the display panel is positioned and a ground surface was 30 degrees.

As shown in FIG. 7, as the radius of the curving edge Cur1 of the corners A, B, C, and D in the display panel increases, the collision distance at which a defect occurs increases. That is, when the corners A, B, C, and D of the display panel are not formed in a curved line, but formed in a pointed corner, the radius of the pointed corner may be 0, such that the collision distance at which a defect occurs is very short. Accordingly, although only a slight impact is applied to the corner of the display panel, defects in the lower substrate 110 or the upper substrate 210 may be generated, or the sealant 310 may be broken or detached.

However, when, as in the exemplary embodiment, the edge of the corners A, B, C, and D of the display panel is a curving edge Cur1, although an external impact is applied to the corner portion, defects in the substrates 110 and 210 or the sealant 310, such as separation or breakage, can be significantly prevented. Particularly, referring to FIG. 7, when the collision distance at which defects occur is measured in a number of display panels with gradually increasing values of the radius R of the curving edge Cur1 of the edge of the corners A, B, C, and D, when the radius R of the curving edge Cur1 is about 5 mm, the collision distance at which defects occur is rapidly increased. As a result, when the radius R of the curving edge Cur1 of the edge of the corners in the display panel shown in FIG. 4 is about 5 mm or more, defects in the substrates 110 and 210 generated during a manufacturing process of the display panel can be significantly reduced.

Therefore, during the manufacturing process of the display panel, in particular while the display panel is transferred, defects in the substrates 110 and 210 or defects in the bonding between the two substrates 110 and 210 that can be generated even by a slight impact can be prevented.

Hereinafter, a display panel according to another exemplary embodiment will be described with reference to FIGS. 8, 9, and 10. The same constituent elements as the exemplary embodiment described above use the same reference numerals and duplicative description is omitted.

Figure 8:
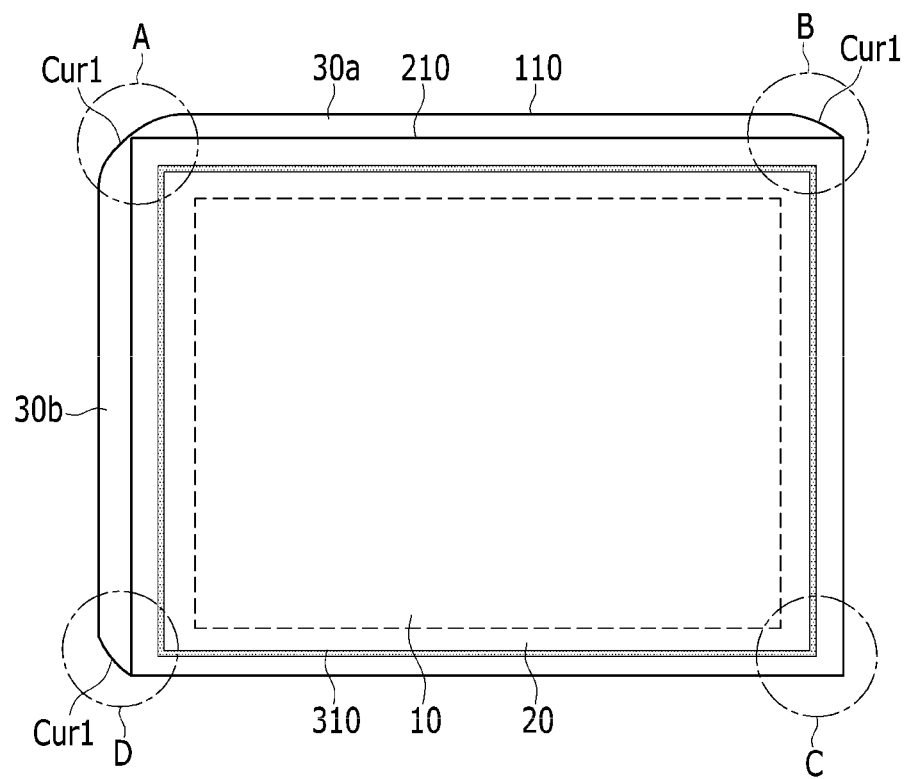
FIGS. 8 and 9 are plan views of a display panel according to an exemplary embodiment.
Figure 9:
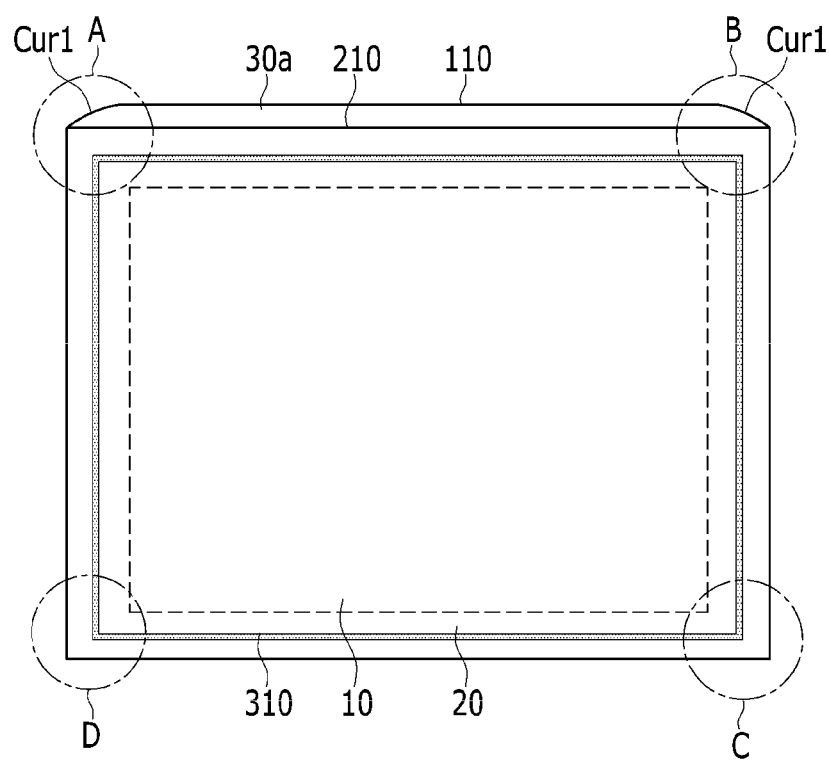
Figure 10:
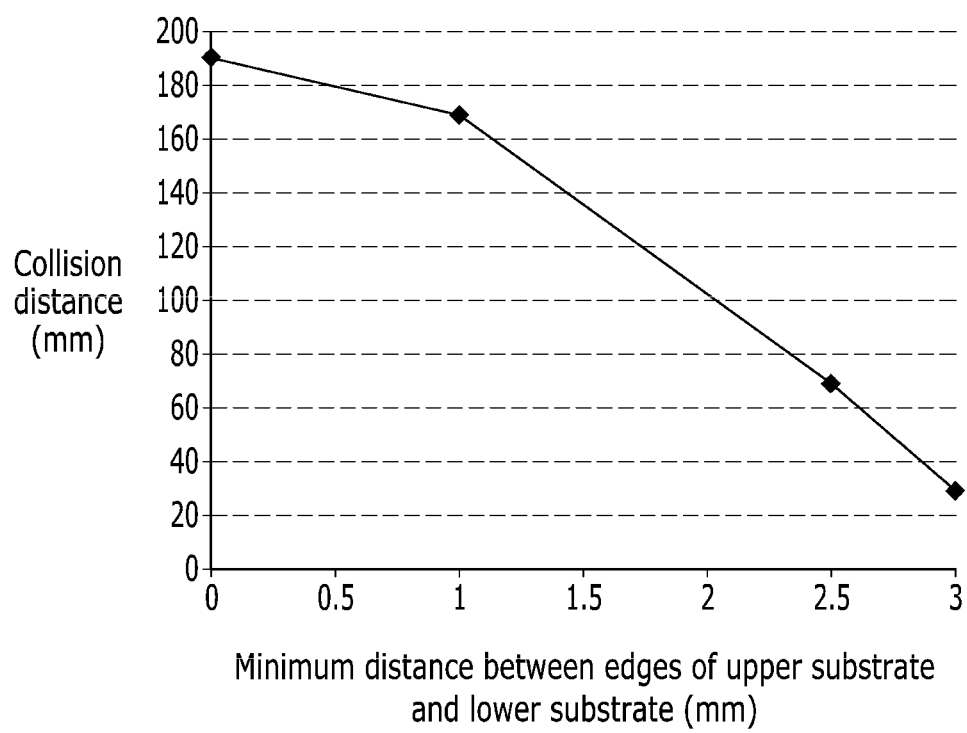
FIG. 10 is a graph illustrating a result of the collision test shown in FIG. 6 under another condition.

FIGS. 8 and 9 are plan views of a display panel according to an exemplary embodiment and FIG. 10 is a graph illustrating a result of the collision test shown in FIG. 6 under another condition.

The exemplary embodiment shown in FIG. 8 is almost the same as the display panel shown in FIG. 1, but includes just two pad regions 30a and 30b in the lower substrate 110. The gate driver may be disposed at the left pad region 30b and the data driver may be disposed at the upper pad region 30a. According to the exemplary embodiment shown in FIG. 8, at least one of corners A, B, and D where the pad regions 30a and 30b meet among four corners of the lower substrate 110 may have a curving edge Cur1.

The exemplary embodiment shown in FIG. 9 is also almost the same as the display panel shown in FIG. 1, but has just one pad region 30a in the lower substrate 110. In this case, the gate driver may be integrated at the left or right edge region of the lower substrate 110. The data driver may be disposed at the upper pad region 30a. According to the exemplary embodiment shown in FIG. 9, at least one of the corners A and B where the pad region 30a meets among four corners of the lower substrate 110 may have a curving edge Cur1.

The right lower corner C where the pad regions 30a and 30b are not formed in FIG. 8, or the lower corners C and D where the pad region 30a is not formed in FIG. 9, are not formed in the curved line, but have a pointed corner so as to each have one vertex, respectively. However, in the right lower corner C where the pad regions 30a and 30b are not formed in FIG. 8 or the lower corners C and D where the pad region 30a is not formed in FIG. 9, the edge of the lower substrate 110 is aligned along the edge of the upper substrate 210, such that it is more difficult for the substrates 110 and 210 and the sealant 310 to become separated, or broken or peeled as the result of an external impact. This may be verified in the collision test where the corner of the display panel without the pad region heads toward the collision surface in the collision test of FIG. 6 described above. This will be described with reference to FIG. 10.

Referring to FIG. 10, as the minimum distance along a direction that is parallel to the surface of the substrates 110 and 210 between the edge of the lower substrate 110 and the edge of the upper substrate 210 becomes smaller in the corner of the display panel, the collision distance at which defects occur is increased. That is, like the corner C of FIG. 8 or the corners C and D of FIG. 9, when the edges of the lower substrate 110 and the upper substrate 210 are aligned with each other to have a minimum distance along a direction that is parallel to the surface of the substrates 110 and 210 of zero, the corner of the display panel may be less bent by an external impact, such that defects in which the substrates 110 and 210 and the sealant are separated or disassembled may be reduced.

Next, a display panel according to several exemplary embodiments will be described with reference to FIGS. 11 to 16. The same constituent elements as the exemplary embodiment shown in FIG. 1 described above use the same reference numerals and the duplicative description is omitted.

FIGS. 11, 12, 13, and 14 are plan views of corners of a display panel according to an exemplary embodiment.

First, referring to FIG. 11A, in the display panel according to the exemplary embodiment, a corner where two pad regions 30a and 30c meet among the corners of the lower substrate 110 may have a curving edge Cur1 like the exemplary embodiment shown in FIG. 1. A minimum distance L1 along a direction parallel to the surfaces of the substrates 110, 210 between the corner of the upper substrate 210 facing the curving edge Cur1 of the lower substrate 110 and the curving edge Cur1 of the lower substrate 110 may be larger than 0. In particular, when the corner of the upper substrate 210 has a pointed corner, a minimum distance L1 between a vertex of the edge of upper substrate 210 and the curving edge Cur1 of the lower substrate 110 may be larger than 0.

Referring to FIG. 11B, the corner of the lower substrate 110 with one pad region 30b may have the curving edge Cur1 like the exemplary embodiment shown in FIG. 1, and the corner of the upper substrate 210 facing the curving edge Cur1 of the lower substrate 110 may have a pointed corner. In this case, the pointed corner of the upper substrate 210 may be positioned so as to be aligned along the lower primary edge of the lower substrate 110. In addition, the position of the pointed corner of the upper substrate 210 may not coincide with the curving edge Cur1 of the lower substrate 110. In detail, when the curving edge Cur1 of the lower substrate 110 includes two end points Pe1 and Pe2, a distance L2 along a direction parallel to the surfaces of the substrates 110 and 210 between the pointed corner of the upper substrate 210 and the end point Pe1 of the curving edge Cur1 of the lower substrate 110 that is close the pointed corner may be 0 or more.

Figure 11:
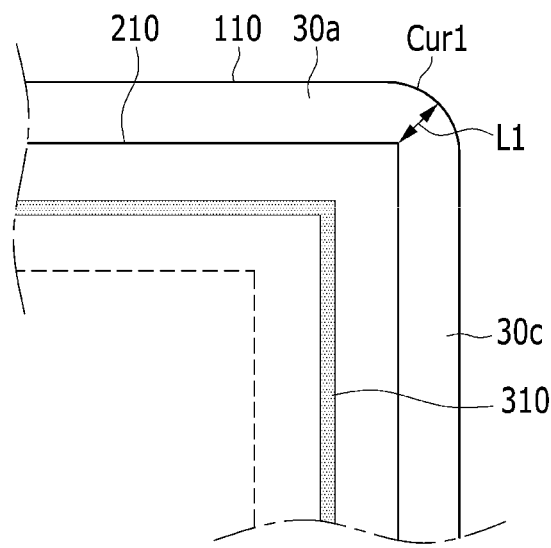
FIGS. 11, 12, 13, and 14 are plan views of corners of a display panel according to an exemplary embodiment.
Figure 11:
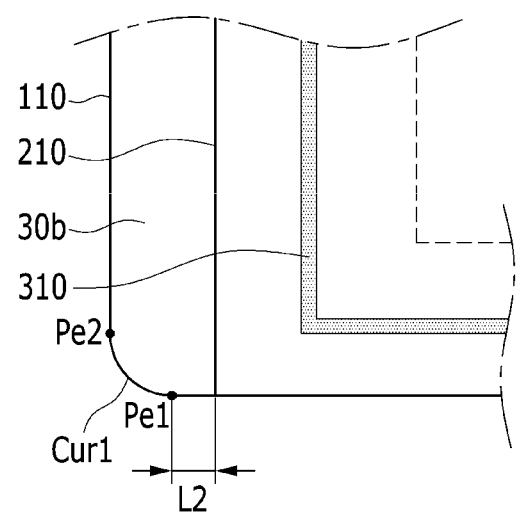

The shape of the corner of the lower substrate 110 shown in FIG. 11 may be applied to other corners of the lower substrate 110. In the exemplary embodiment shown in FIG. 11, characteristics for the curving edge Cur1 of the corner of the lower substrate 110 and an effect thereof are the same as the exemplary embodiment shown in FIG. 1 described above.

Next, referring to FIG. 12A, in the display panel according to the exemplary embodiment, a corner where two pad regions 30a and 30c meet among the corners of the lower substrate 110 may have a curving edge Cur1 like the exemplary embodiment shown in FIG. 1. A corner where two pad regions 30a and 30c meet among the corners of the upper substrate 210 may also have a curving edge Cur2

The curving edge Cur2 of the upper substrate 210 may be formed to have the same shape as a portion of the curving edge Cur1 of the lower substrate 110. The curving edge Cur2 may be aligned along a portion of the curving edge Cur1 so that a minimum distance between the curving edge Cur1 of the lower substrate 110 and the curving edge Cur2 of the upper substrate 210 along a direction parallel to the surfaces of the substrates 110 and 210 is 0.

Referring to FIG. 12B, the corner of the lower substrate 110 having one pad region 30b may have the curving edge Cur1 like the exemplary embodiment shown in FIG. 1. The corner of the upper substrate 210 having one pad region 30b also includes a curving edge Cur2 which may be formed to have the same shape as a portion of the curving edge Cur1. The curving edge Cur2 of the upper substrate 210 may be aligned along a portion of the curving edge Cur1 of the lower substrate 110.

As such, the curving edge Cur1 of the lower substrate 110 and the curving edge Cur2 of the upper substrate 210, which are aligned with each other, may be obtained by cutting both the lower substrate 110 and the upper substrate 210 in the manufacturing process of the display panel. The characteristics for the curving edge Cur1 of the lower substrate 110 described above may equally be applied even to the curving edge Cur2 of the upper substrate 210.

Figure 12:
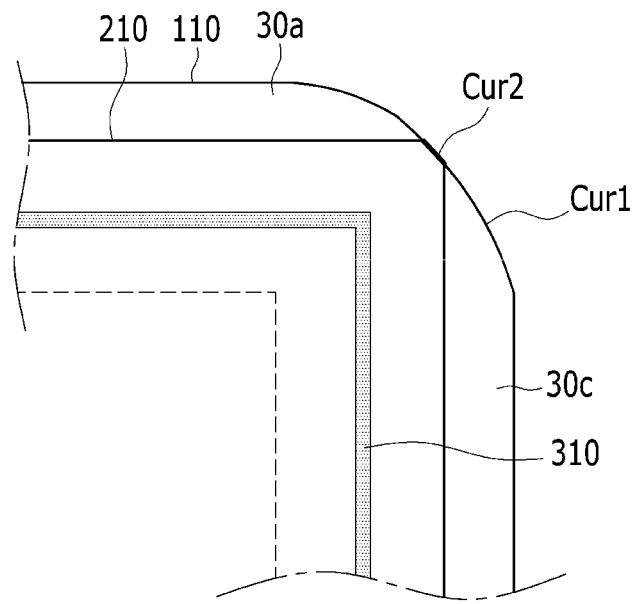
Figure 12:
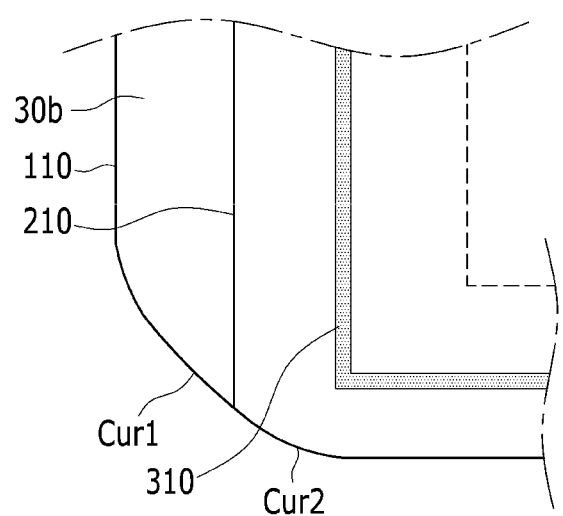

The shapes of the corners of the lower substrate 110 and the upper substrate 210 shown in FIGS. 11 and 12 may be applied to other corners not shown in FIGS. 11 and 12.

Figure 13:
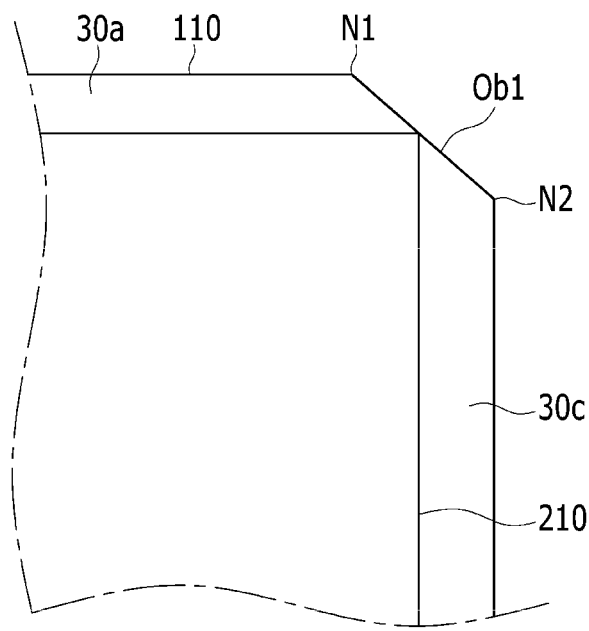
Figure 13:
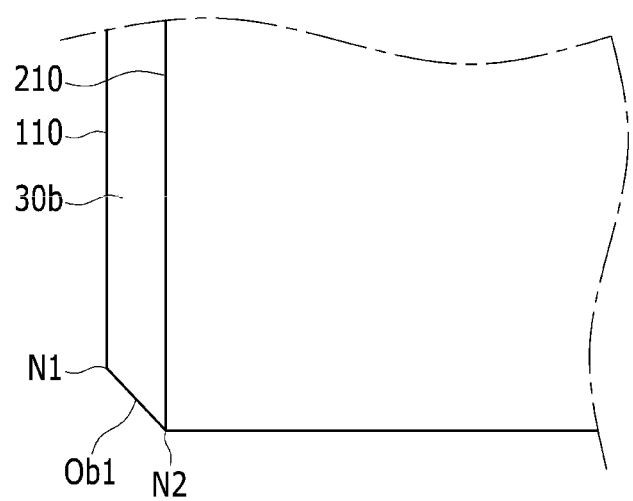
Figure 14:
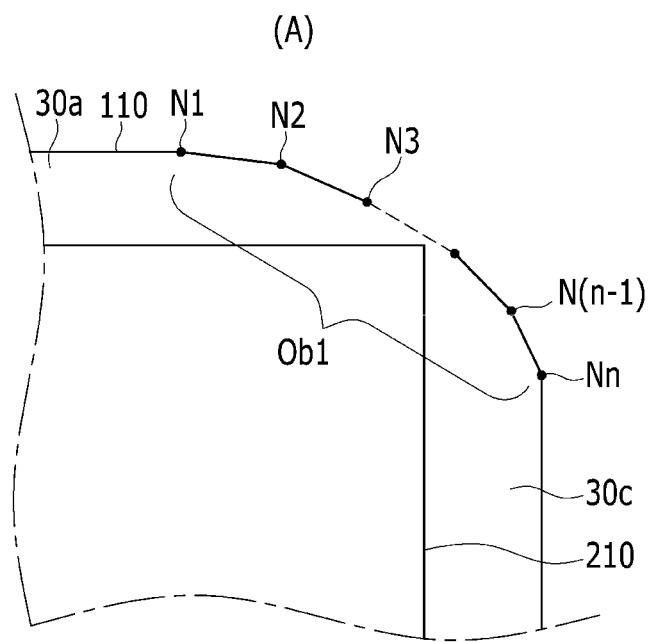
Figure 14:
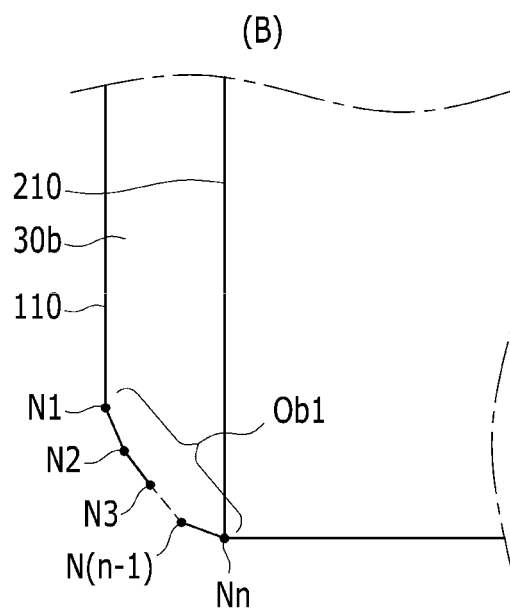

Next, referring to FIGS. 13 and 14, in the display panel according to the exemplary embodiment, a corner where two pad region 30a and 30c meet among the corners of the lower substrate 110 may include an edge shaped as a polygon having at least two vertexes N1, N2, . . . (such a shaped edge referred to herein as a polygonal edge Ob1). In other words, the corner of the lower substrate 110 may include two primary edges positioned at substantially right angles and at least one straight edge therebetween formed, for instance, by chamfering a corner at which the two primary edges meet at least once. Herein, the polygonal edge Ob1 includes at least one straight edge extending obliquely with respect to a direction in which primary edges of the display panel extend and may mean a portion connecting two adjacent primary edges.

FIG. 13A demonstrates a polygonal edge Ob1 of one corner of the lower substrate 110 that includes two vertexes N1 and N2 and one straight edge between the two vertexes N1 and N2.

FIG. 14A demonstrates a polygonal edge Ob1 of one corner of the lower substrate 110 that includes n vertexes Nn (n is a natural number of 2 or more) and n−1 straight edges between the adjacent vertexes Nn.

Referring to FIGS. 13B and 14B, the corner of the lower substrate 110 having one pad region 30b may also include the polygonal edge Ob1 having at least two vertexes N1, N2, . . . and at least one straight edge between two vertexes N1, N2, . . . , like the exemplary embodiment shown in FIGS. 13A and 14A. FIG. 13B shows one corner of the lower substrate 110 that includes the polygonal edge Ob1 having two vertexes N1 and N2 and one straight edge between two vertexes N1 and N2. FIG. 14B shows one corner of the lower substrate 110 that includes n vertexes Nn (n is a natural number of 2 or more) and n−1 straight edges between the adjacent vertexes Nn. Both the n vertexes Nn and the n−1 straight edges between the vertexes may form the polygonal edge Ob1.

In the exemplary embodiments shown in FIGS. 13 and 14, the corner of the upper substrate 210 may include a similar configuration to the exemplary embodiments shown in FIGS. 11 and 12 described above. That is, for a display panel in which the corner portion of the lower substrate 110 has a polygonal edge Ob1, the corresponding corner of the upper substrate 210 may have a pointed corner, and a minimum distance along the direction parallel to the surfaces of the substrates 110 and 210 between one vertex of the pointed corner and the polygonal edge Ob1 of the lower substrate 110 may be 0 or more. Alternatively, the corner of the upper substrate 210 may include an oblique edge having two or more vertexes. In this case, the edge of the corner of the upper substrate 210 may be formed to have the same shape as a portion of the edge of the corresponding corner of the lower substrate 110. The oblique edge of the upper substrate 210 may be aligned along the portion of the edge of the lower substrate 110 so that a minimum distance along a direction parallel to the surfaces of the substrates 110 and 210 between the edge of the corner of the lower substrate 110 and the edge of the corner of the upper substrate 210 may be 0.

The shapes of the corners of the lower substrate 110 shown in FIGS. 13 and 14 may also be applied to other corners of the lower substrate 110.

In the exemplary embodiment shown in FIG. 14, when n is extremely large, for instance, infinite, the polygonal edge Ob1 may have the curving edge Cur1 described above.

Like the exemplary embodiments described above, for the display panel according to the exemplary embodiments shown in FIGS. 13 and 14, even if an external impact is applied to the corner portion of the display panel, the flexible substrates 110 and 210, and the sealant 310, can be significantly prevented from being broken or separated. Accordingly, defects in the two substrates 110 and 210 or the bonding therebetween may be prevented in the manufacturing process of the display panel.

Next, a display panel according to another exemplary embodiment will be described with reference to FIGS. 15 and 16. The same constituent elements as the exemplary embodiment shown in FIG. 1 described above use the same reference numerals and duplicative description is omitted.

Figure 15:
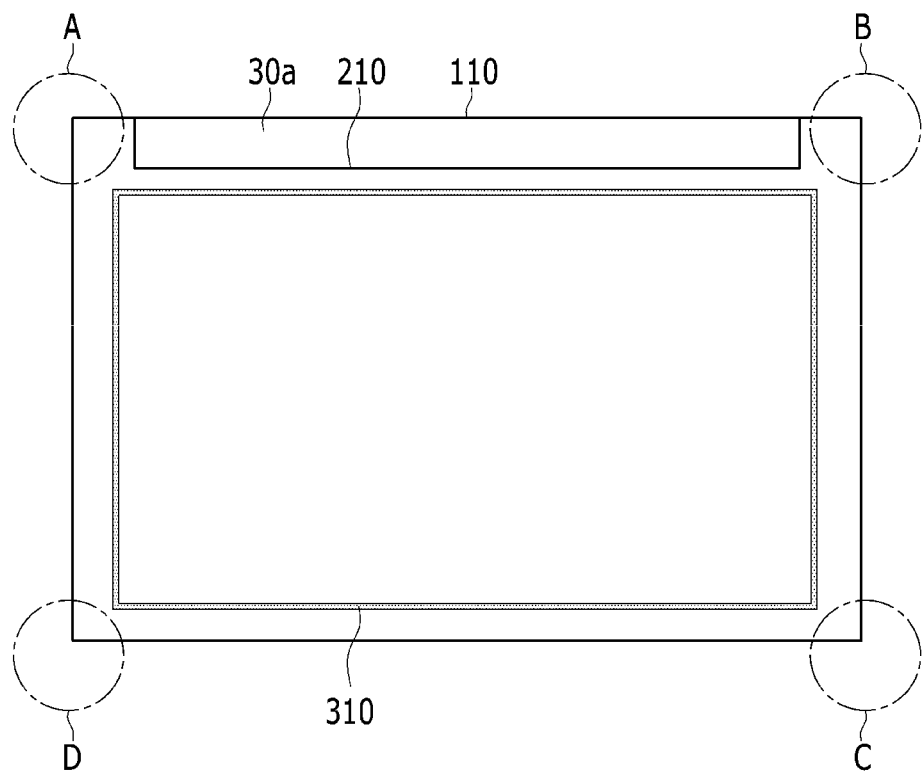
FIGS. 15 and 16 are plan views of a display panel according to an exemplary embodiment.
Figure 16:
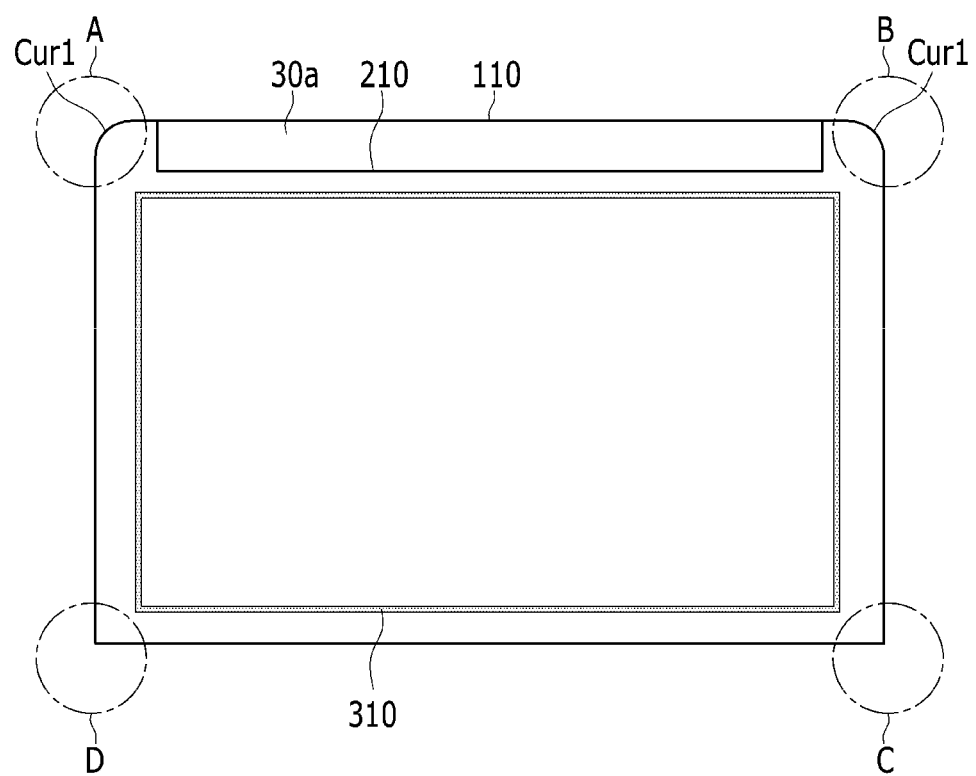

FIGS. 15 and 16 are plan views of a display panel according to an exemplary embodiment.

The lower substrate 110 of the display panel according to the exemplary embodiment shown in FIGS. 15 and 16 includes one pad region 30a which is not covered by the upper substrate 210. The pad region 30a may include, for instance, a pad region of the data line. The pad region 30a does not meet with any one of four corners A, B, C, and D of the display panel. That is, the four corners A, B, C, and D do not include the pad region 30a. Accordingly, the edges of the lower substrate 110 and the upper substrate 210 may coincide with each other along the four corners of the display panel according to the exemplary embodiment. As such, when the edges of the lower substrate 110 and the upper substrate 210 coincide with each other along the four corners of the display panel, defects in the substrates 110 and 210 and the sealant 310 due to an external impact can be significantly reduced as compared to the case in which the lower substrate 110 is exposed.

FIG. 16 shows that at least one of the four corners A, B, C, and D of the display panel shown in FIG. 15 having a curving edge Cur1. As such, when the edges of the lower substrate 110 and the upper substrate 210 coincide with each other along the corners of the display panel to simultaneously having a curving edge Cur1 instead of a pointed corner, defects in which the sealant is separated and thus, a gap between the substrates 110 and 210 is generated, or in which the substrates 110 and 210 are cracked and peeled, can be almost entirely prevented.

Alternatively, instead of curving edge Cur1 as shown in FIG. 16, at least one of the corners of the display panel may include a polygonal edge Ob1 of the exemplary embodiment as shown in FIGS. 13 and 14 described above.

Finally, a method of manufacturing the display panel having various structures described above will be described with reference to FIGS. 17 and 18.

Figure 17:
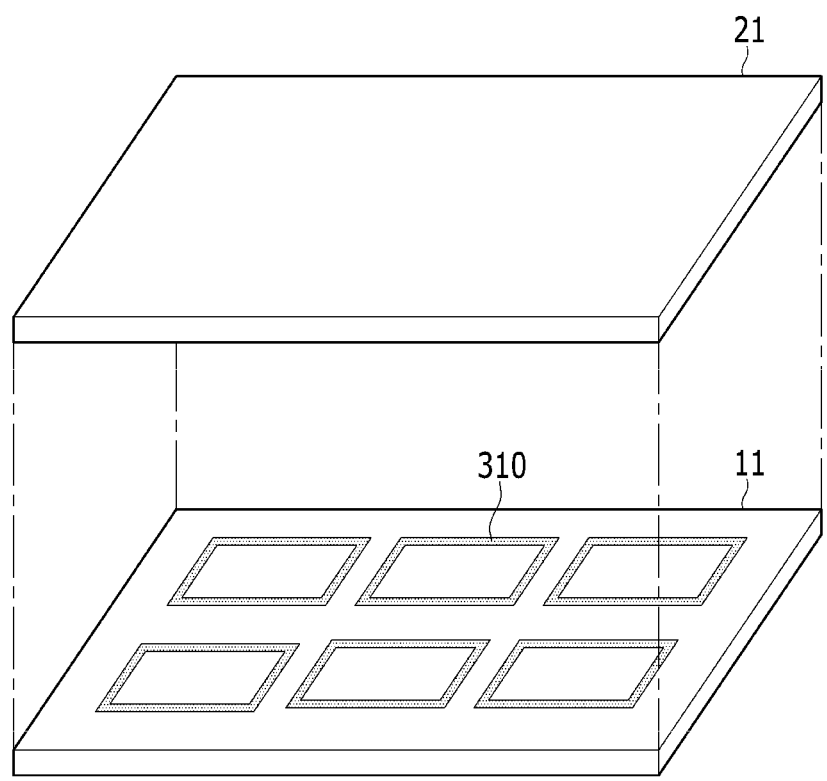
FIGS. 17, 18, and 19 are perspective views illustrating a step in a method of manufacturing a display panel according to an exemplary embodiment.
Figure 18:
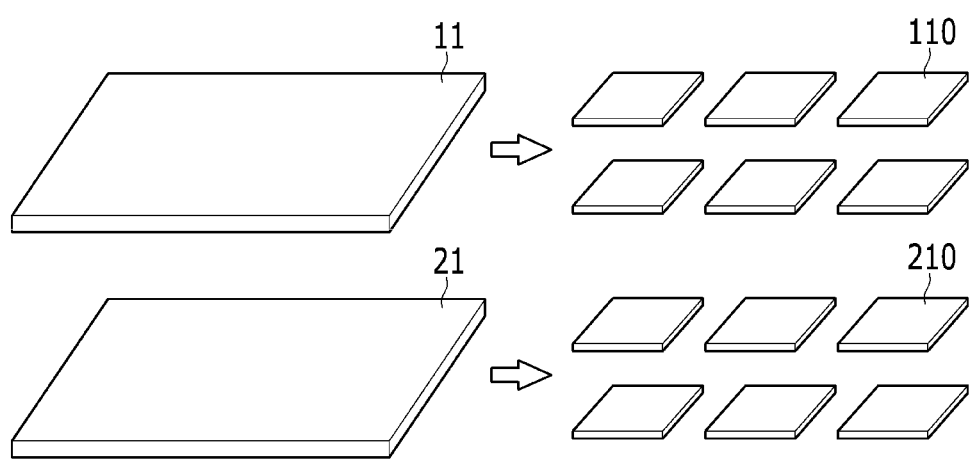
Figure 19:
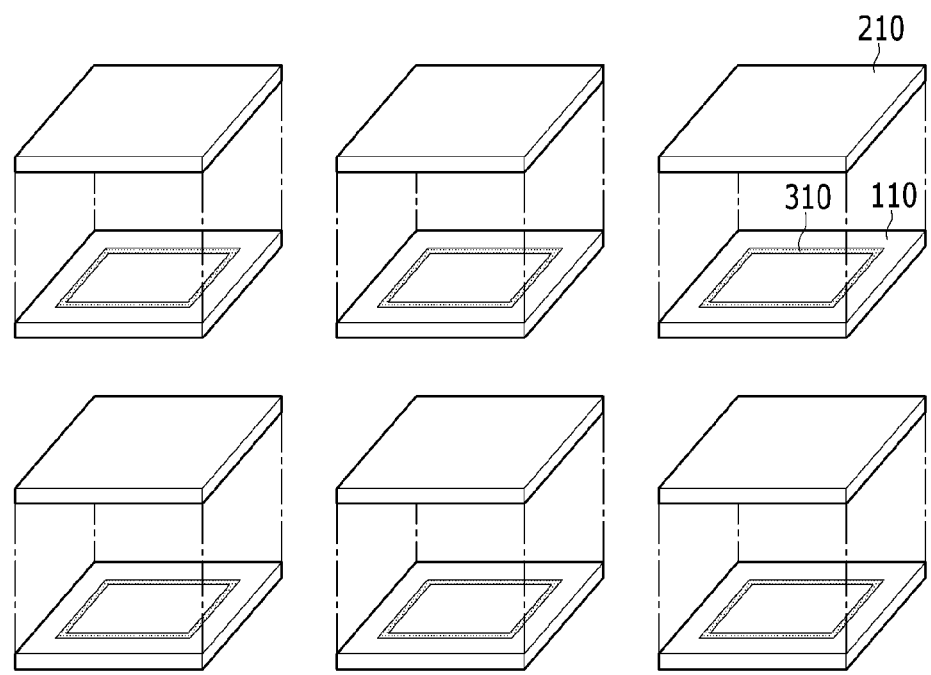

FIGS. 17, 18, and 19 are perspective views illustrating a method of manufacturing a display panel according to an exemplary embodiment.

First, referring to FIG. 17, various signal lines and a plurality of thin films constituting a thin film transistor and the like are formed on a first mother substrate 11 and a plurality of thin films such as an opposed electrode are formed on a second mother substrate 21. In this case, at least one of the first mother substrate 11 and the second mother substrate 21 may be flexible and made of plastic or the like. When only one of the first mother substrate 11 and the second mother substrate 21 is flexible, the other may be made of glass.

Next, after the sealant 310 is formed on the first mother substrate 11 or the second mother substrate 21 and a liquid crystal material is added, the first and second mother substrates 11 and 21 are bonded with each other. Next, the bonded first and second mother substrates 11 and 21 are cut and divided into a plurality of unit display panels so as to have the shapes of the lower substrate 110 and the upper substrate 210 according to various exemplary embodiments described above. In this case, the bonded first and second mother substrates 11 and 21 may be cut by using a laser device.

Alternatively, referring to FIG. 18, each of the first and second mother substrates 11 and 21 may be divided into a plurality of lower substrates 110 and upper substrates 210, respectively before bonding the first mother substrate 11 and the second mother substrate 21. Next, referring to FIG. 19, each of the divided lower substrates 110 and upper substrates 210 makes a pair, and may be bonded by using the sealant 310. In this case, the shapes of the edges of the cut lower substrate 110 and upper substrate 210 may be in accordance with the various exemplary embodiments described above.

In the exemplary embodiment shown in FIGS. 17, 18, and 19, one first mother substrate 11 and/or one second mother substrate 21 are shown divided into six substrates, but the number is not limited thereto.

The several exemplary embodiments described above describe the display panel of the liquid crystal display as an example, but the present invention is not limited thereto and may be applied to other display devices. For example, the form of the display panel according to an exemplary embodiment may be applied to various display devices such as an electrophoretic display, an electrowetting display, and an organic light emitting diode display. This will be described with reference to FIGS. 20, 21, and 22.

Figure 20:
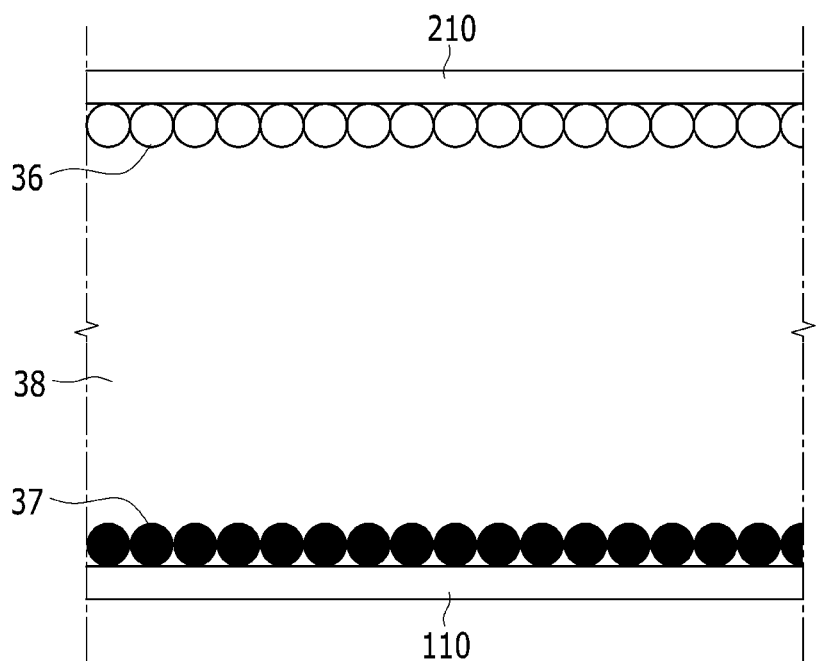
FIG. 20 is a cross-sectional view of a display panel in an electrophoretic display according to an exemplary embodiment.
Figure 21:
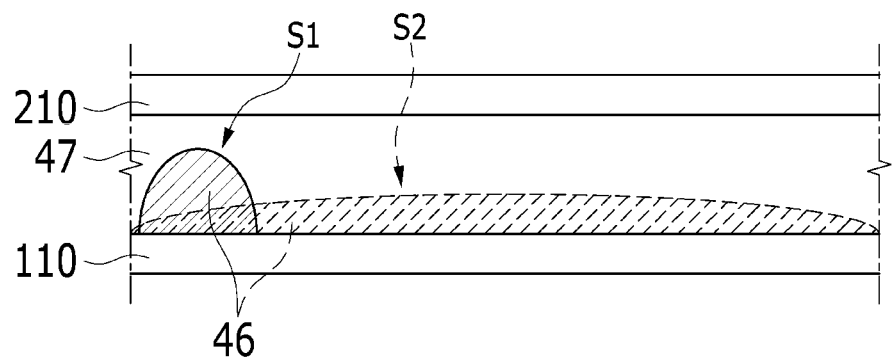
FIG. 21 is a cross-sectional view of a display panel in an electrowetting display according to an exemplary embodiment.
Figure 22:
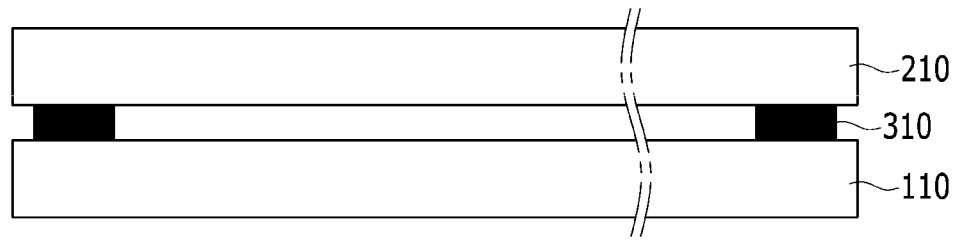
FIG. 22 is a cross-sectional view of a display panel in an organic light emitting diode display according to an exemplary embodiment.

FIG. 20 is a cross-sectional view of a display panel in an electrophoretic display according to an exemplary embodiment, FIG. 21 is a cross-sectional view of a display panel in an electrowetting display according to an exemplary embodiment, and FIG. 22 is a cross-sectional view of a display panel in an organic light emitting diode display according to an exemplary embodiment.

In the structure shown in FIG. 20, an electrophoretic display panel included in the electrophoretic display according to an exemplary embodiment includes a lower substrate 110 and an upper substrate 210 facing each other. A pixel electrode (not shown) is disposed on the lower substrate 110, and an opposed electrode (not shown) is disposed on the upper substrate 210. A plurality of signal lines are disposed on at least one of the lower substrate 110 and the upper substrate 210, and an electrophoretic layer is interposed between the lower substrate 110 and the upper substrate 210. At least one of the lower substrate 110 and the upper substrate 210 may be flexible. When only one of the lower substrate 110 and the upper substrate 210 is a flexible substrate, the other may be a glass substrate. The lower substrate 110 and the upper substrate 210 may be combined by a sealant (not shown). The sealant (not shown) may confine the electrophoretic layer.

The electrophoretic layer may include, for example, white charged particles 36, black charged particles 37, and a transparent dielectric fluid 38, as shown in FIG. 20. The white charged particles 36 and the black charged particles 37 may be charged by opposite electric charges.

The electrophoretic display according to the exemplary embodiment moves the white charged particles 36 and the black charged particles 37 by applying voltage to each of the pixel electrode and the opposed electrode, thereby displaying images having various grays.

Next, referring to FIG. 21, an electrowetting display panel included in the electrowetting display according to an exemplary embodiment includes a lower substrate 110 and an upper substrate 210 facing each other. A first transparent electrode (not shown) is disposed on the lower substrate 110, and a second transparent electrode (not shown) is disposed on the upper substrate 210. A plurality of signal lines are disposed on at least one of the lower substrate 110 and the upper substrate 210. An oil layer 46 is disposed on the lower substrate 110 and having a specific color, and a water layer 47 covers the oil layer 46. At least one of the lower substrate 110 and the upper substrate 210 may be flexible. When only one of the lower substrate 110 and the upper substrate 210 is a flexible substrate, the other may be a glass substrate. The lower substrate 110 and the upper substrate 210 may be coupled by a sealant (not shown).

When voltage is applied between the first transparent electrode and the second transparent electrode, the oil layer 46 enters into a first state S1 in which it is moved to an edge of each pixel. When voltage is not applied between the first transparent electrode and the second transparent electrode, the oil layer 46 is in a second state S2 and covers almost the entire pixel, such that the pixel shows the specific color of the oil layer 46.

Next, referring to FIG. 22, an organic light emitting diode display panel included in the organic light emitting diode display according to an exemplary embodiment includes a lower substrate 110, an organic light emitting diode (not shown) disposed on the lower substrate 110, and an upper substrate 210 sealing the organic light emitting diode. In the exemplary embodiment, the upper substrate 210, which is generally referred to as an encapsulation substrate, is coupled with the lower substrate 110 by a sealant 310, and, together with the sealant, protects the organic light emitting diode and prevents moisture from the outside from entering the display. At least one of the lower substrate 110 and the upper substrate 210 may be flexible.

Additional description on various characteristics of the electrophoretic display, the electrowetting display, and the organic light emitting diode display that is known to persons of ordinary skilled person in the art is omitted.

The display panels included in various display devices such as the electrophoretic display, the electrowetting display, and the organic light emitting diode display may have the same shape and characteristics as the display panel (upper substrate 210 and lower substrate 110) according to FIGS. 1, 4, 5, 8, 9, and 11 to 16 described above and each modified example and may have the same effect.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure including the appended claims.

| <Description of symbols> | |
|---|---|
| 1: Fiber bundle | 2: Polymer resin |
| 3: Liquid crystal layer | |
| 11, 21: Mother substrate | |
| 30a, 30b, 30c: Pad region | |
| 31: Liquid crystal molecule | 110: Lower substrate |
| 210: Upper substrate | 310: Sealant |
| Cur1, Cur2: Curving edge | Ob1: Polygonal edge |

What is claimed is:

1. A display panel, comprising:
a first substrate which is flexible and includes a first corner;
a second substrate which is flexible and faces the first substrate, the second substrate including a second corner; and
a plurality of display elements disposed on the first substrate,
wherein the first substrate includes a first primary edge and a second primary edge which extend in different directions and meet at the first corner,
the first corner of the first substrate includes a first polygonal edge having n (n is a natural number of 2 or more) vertexes,
the first polygonal edge extends in a different direction from the first primary edge and the second primary edge, and
an edge of the second corner of the second substrate directly faces and is flush with the first polygonal edge of the first substrate.

2. The display panel of claim 1, wherein:
the second corner of the second substrate includes a second polygonal edge having n (n is a natural number of 2 or more) vertexes, and
the second polygonal edge has a same shape as at least a portion of the first polygonal edge, and the first corner and second corner are positioned so that the second polygonal edge is aligned with the portion of the first polygonal edge.

3. The display panel of claim 2, wherein:
the first substrate includes at least one pad region.

4. The display panel of claim 3, wherein:
the first corner is connected with the at least one pad region.

5. The display panel of claim 4, wherein:
at least one of the first polygonal edge and the second polygonal edge includes a curving edge in which the n is infinite.

6. The display panel of claim 5, wherein:
the curving edge includes a part of at least one of a circle, an oval, a parabola, a hyperbola, a graph of trigonometrical function, and a graph of a polynomial function.

7. The display panel of claim 5, wherein:
the curving edge includes a part of a circle having a radius in the range of 5 to 200 mm.

8. The display panel of claim 1, wherein:
the first polygonal edge includes a curving edge in which the n is infinite.

9. The display panel of claim 8, wherein:
the curving edge includes a part of at least one of a circle, an oval, a parabola, a hyperbola, a graph of trigonometrical function, and a graph of a polynomial function.

10. The display panel of claim 8, wherein:
the curving edge includes a part of a circle having a radius in the range of 5 to 200 mm.

11. The display panel of claim 1, wherein:
the first polygonal edge includes a first curving edge in which the n is infinite.

12. The display panel of claim 11,
wherein the second corner includes a second curving edge having a same shape as at least a portion of the first curving edge, and the second curving edge is aligned with the portion of the first curving edge.

13. The display panel of claim 12, wherein:
the shape of at least one of the first curving edge and the second curving edge corresponds to a part of at least one of a circle, an oval, a parabola, a hyperbola, a graph of trigonometrical function, and a graph of a polynomial function.

14. The display panel of claim 11, wherein:
the first curving edge is a circle having a radius in the range of 5 to 200 mm.

15. The display panel of claim 1, wherein:
the second corner of the second substrate includes a second polygonal edge having n (n is a natural number of 2 or more) vertexes.

16. A display panel, comprising:
a first substrate and a second substrate which face each other and are flexible; and
a plurality of display elements disposed on the first substrate,
wherein the first substrate has a plurality of corners including a first corner having a first shape, and the second substrate has a plurality of corners including a second corner having a second shape, the first shape being different from the second shape; and
at least a part of the first corner directly faces and is flush with the second corner.

17. The display panel of claim 16, wherein each of the edge of the first substrate and the edge of the second substrate at one of the corners of the first and second substrates includes a polygonal edge having n (n is a natural number of 2 or more) vertexes.

18. The display panel of claim 17, wherein:
the first substrate includes a pad region and
the pad region is positioned between two adjacent corners.

* * * * *